United States Patent

Dessy

[15] 3,644,670

[45] Feb. 22, 1972

[54] TELEGRAPHIC TRANSMISSION SYSTEM

[72] Inventor: Lucien Dessy, Jumet, Belgium

[73] Assignee: Acec Ateliers De Constructions Electriques De Charleroi, Charleroi, Belgium

[22] Filed: Jan. 29, 1970

[21] Appl. No.: 6,723

[30] Foreign Application Priority Data

Jan. 30, 1969 Belgium ....................................69382

[52] U.S. Cl. ....................................178/17 B, 340/347 DA

[51] Int. Cl. ....................................................H04l 17/08

[58] Field of Search...........................178/89, 92, 17.5, 23 A; 325/163, 320; 179/84 VF, 114 A, 115 A

[56] References Cited

UNITED STATES PATENTS

| | | | |
|---|---|---|---|
| 3,422,357 | 1/1969 | Browne | 325/320 |
| 3,235,661 | 2/1966 | Oxley et al. | 178/26 |

*Primary Examiner*—Kathleen H. Claffy
*Assistant Examiner*—Horst F. Brauner
*Attorney*—Raymond A. Robic

[57] ABSTRACT

A telegraphic transmission system for the transmission of series of bits of the same number in which each series of bits to be transmitted is divided into two groups. The transmitter of the system comprises coding devices assigning to each even combination of bits of the first group of each series of bits a frequency chosen in a first group of frequencies for transmitting such frequency during a first moment, and assigning to each even combination of bits of the second group of each series of bits a frequency chosen in a second group of frequencies for transmitting such frequency during a second moment following the first moment and of the same duration. The coding devices assign to each odd combination of bits of the first group of each series of bits a frequency chosen in the second group of frequencies for transmitting such frequency during the first moment, and assign to each odd combination of bits of the second group of each series of bits a frequency chosen in the first group of frequencies for transmitting such frequency during the second moment. The receiver comprises a switching device operated by a pilot clock at the rate of the moments of transmission, two identical frequency selectors to which the switching device alternatively applies the signals received by a detector associated with each selector, and a decoding device connected to both selectors for regrouping the two groups of the series of bits.

3 Claims, 2 Drawing Figures

INVENTOR
Lucien DESSY

BY Raymond A. Robic

ATTORNEY

INVENTOR
Lucien DESSY

BY

[signature]

ATTORNEY

TELEGRAPHIC TRANSMISSION SYSTEM

This invention relates to a telegraphic transmission system for transmitting series of bits of the same number.

Plural transmission systems of this nature are known such as, for example, the one disclosed in U.S. Pat. No. 2,771,506 transmitting series of five bits. Each series of bits is divided in two groups, the first one containing three digits and the second one containing two digits. A frequency chosen from a group of eight transmission frequencies is assigned to each combination of bits in the first group of three bits and a second frequency chosen in a second group of four frequencies is assigned to each combination of bits in the second group of bits. The two frequencies so selected are transmitted in two consecutive moments of equal duration.

In the above known transmission system, a parity control is not provided for. Parity detectors are known however for other systems. Some teleprinters are normally equipped with a mechanical device providing a parity control on the characters received. Upon receiving an erroneous combination of bits, an electrical contact is closed to operate a signalling device and/or to print an "error" character.

The object of the invention is to provide a transmission system for teleprinters of the type disclosed above, having a high signal/noise ratio, narrow bandwidth, and permitting a parity control. To achieve the object of the invention in an economical fashion, it becomes necessary to abandon the idea of assigning to each combination of bits of the first group of each series of bits a frequency chosen in a first group of frequencies for transmitting such frequency in the first moment, and of assigning to each combination of bits in the second group of each series of bits a frequency chosen in a second group of frequencies.

The telegraphic transmission system, in accordance with the invention, comprises a transmitter including coding devices assigning to each even combination of bits of the first group of each series of bits a frequency chosen in a first group of frequencies for transmitting such frequency in a first moment, and assigning to each even combination of bits in the second group of each series of bits a frequency chosen in a second group of frequencies for transmitting such frequency in the second moment. The coding devices assign to each odd combination of bits of the first group of each series of bits a frequency chosen from the second group of frequency for transmitting such frequency in the first moment, and assign to each odd combination of bits in the second group of each series of bits a frequency chosen in the first group of frequencies for transmitting such frequency in the second moment. The receiver comprises a switching device operated by a pilot clock at the rate of the transmission moments, two identical frequency selectors to which the switching device alternatively applies the signals received by a detector associated with each selector, and a decoding device connected to the two selectors for regrouping the two groups of the series of bits.

The invention will now be disclosed, by way of example, with reference to an embodiment of the invention and referring to the accompanying drawings in which.

The invention is particularly suitable to telegraphic transmission systems for teleprinters using a code having more than five digits, in particular the ones using the ISO code. The embodiment disclosed relates to the transmission of an alphabet of 128 symbols.

Figure 1:
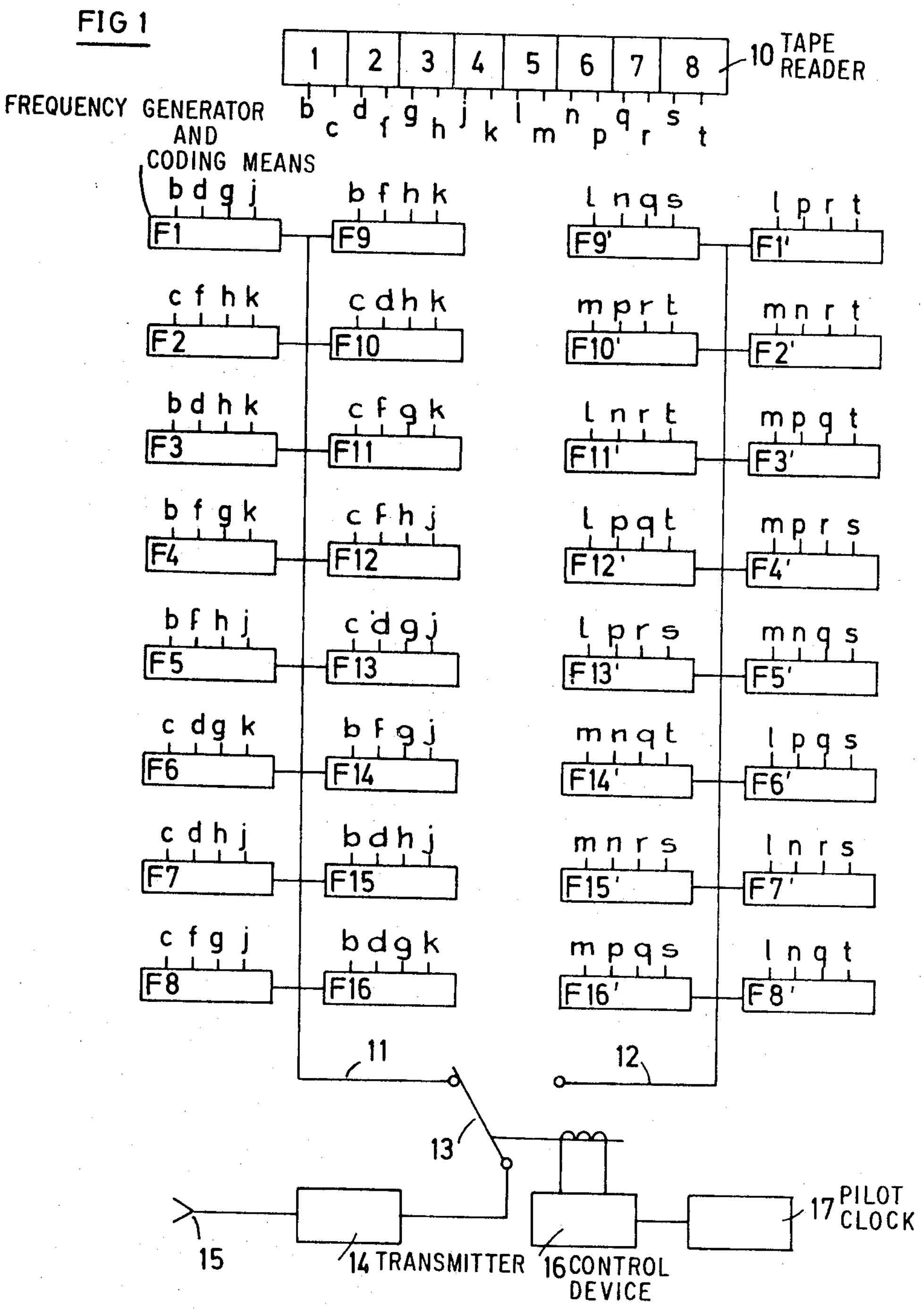
FIG. 1 is a schematic diagram of a coding device.

In FIG. 1 is shown a block diagram of the transmitter of a telegraphic modulator-demodulator comprising a perforated tape reader 10 equipped with eight reading heads 1 to 8 generating "black" signals *b, d, g, j, l, n, q, s*, or "white" signals *c, f, h, k, m, p, r, t*. The signals *b* to *t* of reader 10 are fed to two sets of frequency generators $F_1$ to $F_{16}$ and $F'_1$ to $F'_{16}$ which are respectively identical. Each generator $F_1$ to $F_{16}$ and $F'_1$ to $F'_{16}$ consists of a AND circuit having four inputs and a frequency generator of the tuning fork type. For each of the 128 symbols of the alphabet, a single frequency is transmitted by the assembly of frequency generators $F_1$ to $F_{16}$ and a single frequency is transmitted by the assembly of frequency generators $F'_1$ to $F'_{16}$. Consequently, for each combination of bits generated by reader 10, a single frequency $f_I$ appears on the conductor 11 and a single frequency $f_{II}$ appears on the conductor 12. These two conductors are connected through a switching device 13 to a transmitter 14 and an antenna 15. The switching device 13 is operated by a control device 16 operating at a rate determined by a pilot clock 17.

When the switching device 13 is in the position indicated in FIG. 1, the device 14 transmits the frequency $f_I$ appearing on the conductor 11 during a first moment. Such frequency $f_I$ is chosen either in the group of frequencies generated by the generators $F_1$ to $F_8$ if the combination of the first four bits to be transmitted is even, or in the group of frequencies generated by the generators $F_9$ to $F_{16}$ if the combination of the first four bits is odd. If the combination of the bits fed to generators $F_1$ to $F_{16}$ and $F'_1$ to $F'_{16}$ consists of an even number of "black" and "white" bits such as *b,d,g,j*, (four black bits), *c,f,h,k*, (two black and two white bits), or *c,f,h,k* (four white bits) then the combination is said to be an "even" combination of bits. On the other hand, if the combination of bits fed to generators $F_1$ to $F_{16}$ and $F'_1$ to $F'_{16}$ consists of odd numbers of "black" bits and "white" bits, such as *l, p, s, t* (one black and three white bits) or *l, p, q, s* (three black and one white bits), then the combination is said to be an odd combination of bits. When the switching device 13 is operated, the device 14 transmits the frequency $f_{II}$ appearing on the conductor 12. Such frequency $f_{II}$ is in the group of frequencies generated by generators $F'_1$ to $F'_8$ if the frequency which previously appeared on conductor 11 was generated by the group of generators $F_9$ to $F_{16}$ and, inversely, the frequency $f_{II}$ is in the group of frequencies generated by generators $F'_9$ to $F'_{16}$ if the frequency which previously appeared on the conductor 11 was generated by the group of generators $F_1$ to $F_8$. The above is due to the fact that each character transmitted is represented by an even combination of bits and, more particularly, that the two combinations of four bits originating one from reading heads 1 to 4 and the other from reading heads 5 to 8 are either both even or both odd but never even-odd which would give an odd combination. Such odd combination could be detected as an error by a parity control device which is not shown but generally incorporated in the receiving teleprinter.

The switching device 13 governs the succession of the transmission moments. When the switching device is in the position illustrated in FIG. 1, the antenna 15 emits frequency $f_I$ during the first moment. When the switching device 13 is operated, it emits a frequency $f_{II}$ during the second moment. Nevertheless, the frequencies $f_I$ and $f_{II}$ are not in themselves different and recognizable between themselves. Indeed, the generators $F_1$ to $F_{16}$ and $F'_1$ to $F'_{16}$ being respectively identical, $F_k$ and $F'_k$ both generate the same frequency $f_k$. The advantage of such a feature is that the bandwidth of the transmission system is narrower. However, to obtain such advantage, it is necessary to ensure that there is a perfect synchronization between the transmitting and receiving moments.

It is easy to establish synchronism between two telegraphic modulators-demodulators or between two teleprinters by using one of the symbols to be transmitted as an interval signal. The synchronism, once established, lasts for a long period of time when pilot clocks of high precision are used. From a practical point of view, only a small correction effected daily is sufficient to continuously maintain synchronism between two or plural telegraphic modulators-demodulators or between two or plural interconnected teleprinters. A device permitting to establish synchronism between telegraphic modulators-demodulators, that is a transmitter and a receiver, is disclosed, for example, in Belgian Pat. No. 727,636.

Figure 2:
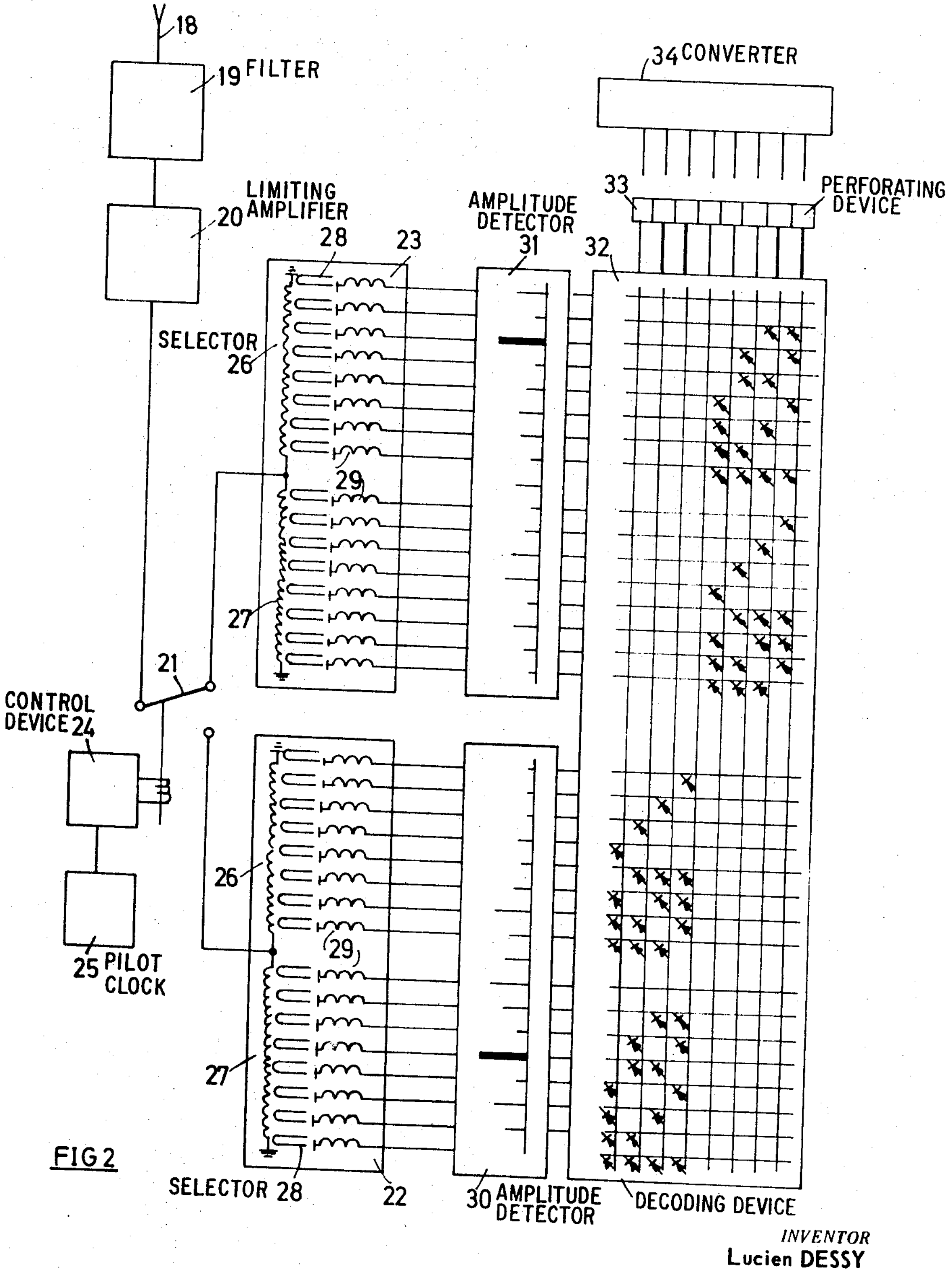
FIG. 2 is a schematic diagram of a receiver including a decoding device.

In the receiver illustrated in FIG. 2, the signals transmitted are received by an antenna 18. Such signals flow through a filter 19 whose band width is limited to the one necessary to pass the 16 frequencies generated by generators $F_1$ to $F_{16}$ or $F'_1$ to $F'_{16}$ (FIG. 1) of the transmitter. The signals at the output of filter 19 may be equalized by a limiting amplifier 20 and subsequently applied through a switching device 21 to one of two selectors 22 and 23. The switching device 21 is operated by a control device 24 at a rate determined by a pilot clock 25. The selectors 22 and 23 are identical and each of them comprises two excitation windings 26 and 27, 16 tuning forks 28 and 16 detection windings 29. The signal appearing in a detection winding 29 is proportional to the amplitude of the signal of the tuning fork associated with the winding. The output of all the windings 29 of each selector 22 and 23 are applied respectively to the input of two amplitude detectors 30 and 31. Each amplitude detector 30 or 31 is equipped with 16 inputs and 16 outputs and has a variable detection threshold which decreases gradually. Therefore, the signal which is first detected is the one having a maximum amplitude. In detecting a signal, the detector automatically locks itself and transmits at its output a signal corresponding to the first detected signal, while the signal appearing on all its other outputs is null, whatever may be the amplitude of the signals at the inputs corresponding to such other outputs. The 32 outputs of the two detectors 30 and 31 are fed to the input of a decoding device 32 comprising eight outputs corresponding to the eight original bits. The eight outputs of device 32 are fed, for example, to a band-perforating device 33, or to a coder or parallel series converter 34 in which the start and stop bits are added. When transformed in the above manner, the messages may be received by a terminal teleprinter which may be equipped with a parity control device.

I claim:

1. A telegraphic transmission system for transmitting messages by series of a predetermined number of bits each one divided into two groups of bits, comprising:

a. a transmitting device including a plurality of first, and a plurality of second generators, each one emitting a characteristic frequency when actuated and connected to a first output line, a plurality of third generators identical to the second generators and a plurality of fourth generators identical to the first generators, said third and fourth generators being connected to a second output line, a plurality of first coding devices each one combined with one of said first generators each one having inputs sensitive for a characteristic combination of bits of the first group for actuating the generator if said characteristic combination of bits of the first group occurs, a plurality of second coding devices, each one combined with one of said second generators, each one having inputs sensitive for an other characteristic combination of bits of the first group of bits for actuating the generator if said other characteristic combination of bits of the first group occurs, a plurality of third coding devices, each one combined with one of said third generators, each one having inputs sensitive for a characteristic combination of bits of the second group for actuating the generator if said characteristic combination of bits of the second group occurs, a plurality of fourth coding devices, each one combined with one of said fourth generators, each one having inputs sensitive to another characteristic combination of bits of the second group for actuating the generator when said other characteristic combination of bits of the second group occurs, a switching device connected to a transmitter for alternatively transmitting the frequencies emitted on said first and second output lines and a clock-operated control device for said switching device; and b. a receiving device for receiving the output signals of said transmitter including a clock-operated control device actuating a switching device at the rate of the switching device of the transmitter, two identical detectors adapted to alternatively receive the output signals of said transmitter through the switching device of the receiving device, each detector having a plurality of frequency selectors, each one sensitive to one of the characteristic frequencies of said first or third and second or fourth generators, and a decoding device connected to the selectors of both detectors for regrouping the two groups of the series of bits.

2. A telegraphic transmission system as defined in claim 1, further comprising a limiting amplifier connected at the input of said receiving device for limiting the signals received by said receiving device.

3. A telegraphic transmission system as defined in claim 1, further comprising an amplitude detector connected to each of said frequency selectors, said amplitude detectors having a variable detection threshold which decreases gradually.

* * * * *